Nov. 13, 1956   J. C. ISBELL   2,770,487
TRUCK WINDOW UNIT
Filed Oct. 6, 1954

INVENTOR.
J. C. Isbell
BY
J J Dunlap
ATTORNEY 2,770,487

TRUCK WINDOW UNIT

Jessie C. Isbell, Oklahoma City, Okla., assignor to
Leo W. Barber, Oklahoma City, Okla.

Application October 6, 1954, Serial No. 460,707

2 Claims. (Cl. 296—47)

This invention relates to improvements in trucks and more particularly, but not by way of limitation, to an improved window unit for the rear window opening of a truck cab.

As is well known in the oil industry, many present day trucks are provided with various types of machinery mounted on the bed of the truck, and the hand levers for operating this machinery are ordinarily located immediately behind the cab of the truck. Furthermore, the rear windows in the present day trucks are fixed and cannot be opened. Therefore, the driver of the truck must get out of the cab to operate the hand levers. Also, during the summer months, the permanently closed back windows limit air circulation through the cab and add to the discomfort of the driver.

The present invention contemplates a novel window unit which replaces the ordinary rear window of a truck cab. The unit may be readily adapted to fit the usual rear window opening of a truck without modifying the truck structure in any way. Upon removal of the usual fixed window, a unit constructed in accordance with the present invention is merely inserted in the window opening and secured by the usual window retaining ring. The present invention contemplates a complete window unit having sliding transparent panels, wherein the usual visibility is substantially retained and access may be gained from the inside of the truck cab to any equipment positioned immediately behind the cab.

An important object of this invention is to facilitate the operation of truck-mounted machinery.

Another object of this invention is to increase the circulation of air through a truck cab, when and as desired.

Another object of this invention is to provide a window unit which may be installed in an existing truck cab without modification of the truck.

A further object of this invention is to provide a novel sliding panel window unit for the rear of a truck cab which the truck driver can open when desired.

A still further object of this invention is to provide a durable sliding panel window for a truck cab which will be weatherproof and protect the truck driver from precipitation.

Another object of this invention is to provide a simple window unit for a truck cab which may be economically manufactured.

Other objects and advantages of the invention will be evident from the following detailed description, when read in conjunction with the accompanying drawings, which illustrate my invention.

Figure 1:
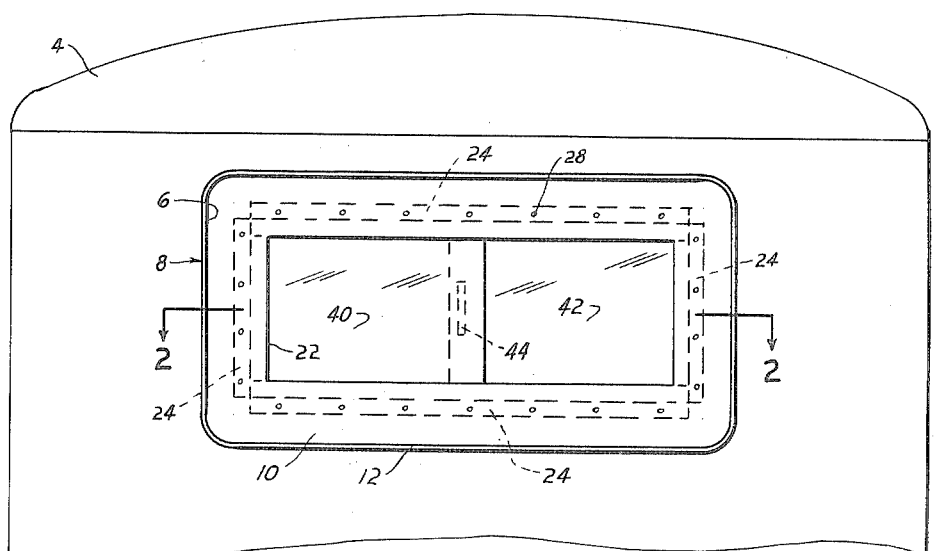
Figure 1 is a partial rear elevational view of a truck cab having my novel window unit installed therein.

Referring to the drawings in detail, and particularly Figure 1, reference character 4 designates a truck cab having the usual rear window opening 6 therein. Although the opening 6 is shown as being substantially rectangular with rounded corners, it will be understood that the shape of the window opening 6 varies with the various makes of trucks and may be of substantially any shape, such as having inclined side edges and a curved top (not shown), for example.

Figure 3:
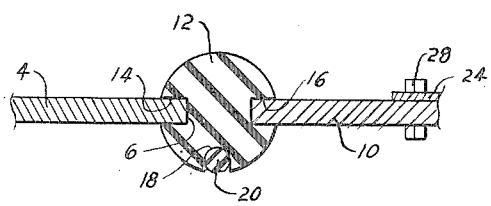
Figure 3 is a detailed sectional view of the retaining ring utilized to secure my window unit in a truck window opening.

My novel window unit, generally designated at 8, is constructed to fit in the opening 6, as shown in Figure 1, regardless of the shape of the opening 6. The window unit 8 comprises a base plate 10 having a contour corresponding in size and shape to the contour of the window opening 6. In securing the base plate 10 to the edges of the opening 6, I prefer to utilize the usual elastic retaining ring 12 (ordinarily rubber) which was used to secure the original window glass (not shown) in the cab 4. The groove 14 (see Figure 3) formed in the outer periphery of the ring 12 receives the edges of the opening 6 in the usual manner. And the groove 16 formed in the inner periphery of the ring 12 receives the outer edges of the base plate 10 instead of the usual glass window. A circumferential groove 18 is formed in one side of the retaining ring 12 to receive a locking cord 20 and compress the sides of the grooves 14 and 16 against the edges of the opening 6 and the base plate 10 respectively.

Figure 2:
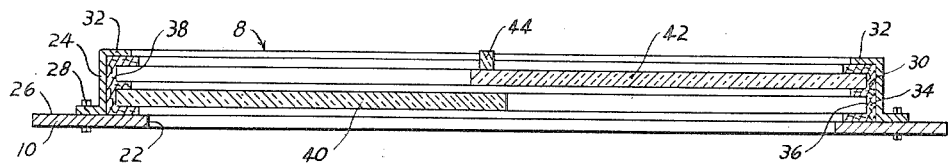
Figure 2 is an enlarged sectional view of the window unit as taken along lines 2—2 of Figure 1.

A substantially rectangular opening 22 (see Figure 1) is formed in the central portion of the base plate 10 to provide an adequately sized access opening from the interior to the exterior of the cab 4. A Z-shaped clamping flange 24 (Figure 2) is secured to the inner face 26 of the plate 10 along each side of the opening 22 by a plurality of bolts 28 or spot welds (not shown). When spot-welding is used, at least one clamping flange 24 should be bolted to facilitate replacement of the panels as will be more fully hereinafter set forth. As shown by dotted lines in Figure 1, the clamps or flanges 24 are overlapped at the corner of the opening 22 to provide a continuous annular chamber 30 (Figure 2) between the outer flange portions 32 of the clamps 24 and the inner face 26 of the plate 10. It will also be observed that the chamber 30 faces inwardly, or is open on its inner periphery.

Suitable packing material 34, such as felt or the like, is retained in the chamber 30 and extends the length of the chamber 30. The packing material 34 is substantially E-shaped in cross section to provide a pair of continuous circumferential grooves 36 and 38 in the inner periphery thereof. The grooves 36 and 38 are rectangular to extend uniformly around the opening 22 and to slidingly receive transparent rectangular panels 40 and 42 respectively. Each of the panels 40 and 42 is shorter than the length of the opening 22, but longer than one-half the length of the opening 22, to provide a super-imposed, overlapping relation and effectively close the opening 22 when in the positions shown in Figures 1 and 2. The packing 34 provides a weather-tight seal between the overlapping panels 40 and 42. It will be apparent that the panels 40 and 42 may be moved horizontally back and forth in their respective grooves to open and close the opening 22. A handle 44 may be cemented or otherwise rigidly secured to the innermost panel 42, if desired, to facilitate manipulation of the panels.

Obviously the flange 24 may be secured to the outer face of the plate 10 and, when thus installed, all precipitation draining from the cab 4 and the panels 40 and 42 into the E-shaped strip 34 will not enter the truck cab, because the lower edge of the opening 22 is higher than the upper edge of the adjacent flange 24.

The operation of the window unit 8 is believed to be apparent from the foregoing discussion. When the usual rigid window glass is removed, the unit 8 is placed in the window opening 6 with the edges of the opening 6 in the outer groove 14 of the retaining ring 12 and the edges of the base plate 10 in the inner groove 16. The locking cord 20 is then pressed in the groove 18 to secure the window unit 8 in position. It will be observed that the unit 8 is positioned with the inner face 26 and clamps 24 inside of the cab 4 to provide a weather tight closure. The panels 40 and 42 may be slid back and forth in the grooves 36 and 38 by the truck driver from inside the cab 4 to open or close the opening 22. The opening 22 is of a sufficient size to provide a clear view through the rear of the cab 4 and provide access to any machinery positioned behind the cab. When the panels 40 and 42 are moved to one side of the unit 8, air circulation in the cab 4 will be materially increased.

From the foregoing it is apparent that the present invention will facilitate the operation of truck mounted machinery and will increase the circulation of air through the truck cab when desired. The present window unit may be installed in an existing truck cab window opening without modifying the truck, and may be opened as desired by the truck driver. It will also be apparent that the present invention provides a simple and durable truck window unit which will protect the truck driver from the weather and which may be economically manufactured.

Changes may be made in the combination and arrangement of parts, as heretofore set forth in the specification and shown in the drawings, it being understood that any modification in the precise embodiment of the invention may be made within the scope of the following claims without departing from the spirit of the invention.

I claim:

1. A window unit for a truck cab having a window opening therein, comprising a base plate having a contour of a size and shape corresponding to the contour of the window opening, an elastic retaining ring having grooves in the outer and inner peripheries thereof of a size to receive the edge of the window opening and the outer edge of the base plate respectively, whereby the base plate may be secured in the window opening, said base plate having a rectangular opening in the central portion thereof, Z-shaped clamps secured to the face of the base plate to form an inwardly opening U-shaped chamber around the last-mentioned opening, packing in said chamber having a pair of circumferential grooves in the inner periphery thereof, and a rectangular transparent panel slidingly supported in each of said grooves for covering and alternately partially uncovering the last-mentioned opening.

2. A window unit for a truck cab having a rear window opening therein and having an elastic retaining ring carried by the edge of the window opening, said ring having a groove in its inner periphery, comprising: a substantially flat base plate having a contour of a size and shape corresponding in relatively close spaced relation to the contour of the window opening, the outer edge of said base plate disposed within the groove of said ring for holding said base plate within the window opening, said base plate having a rectangular central opening; Z-shaped clamps secured to the outer face of the base plate forming an inwardly opening U-shaped chamber adjacent the edge of said plate defining the rectangular opening; E-shaped packing carried by said chamber with the grooves thereof disposed inwardly; and a pair of rectangular transparent panels slidingly carried in overlapping relation by the grooves of said packing for covering and alternately partially uncovering the rectangular opening in said plate.

References Cited in the file of this patent

UNITED STATES PATENTS

| | | |
|---|---|---|
| 2,189,138 | Eichner | Feb. 6, 1940 |
| 2,701,162 | Kliger | Feb. 1, 1955 |

FOREIGN PATENTS

| | | |
|---|---|---|
| 578,362 | Great Britain | June 25, 1946 |
| 609,665 | Great Britain | Oct. 5, 1948 |